United States Patent [19]

Kubota

[11] 4,167,763

[45] Sep. 11, 1979

[54] TRACKING-ERROR CORRECTING SYSTEM FOR USE WITH RECORD MEDIUM SCANNING APPARATUS

[75] Inventors: Yukio Kubota, Tokyo, Japan

[73] Assignee: Sony Corporation, Tokyo, Japan

[21] Appl. No.: 825,861

[22] Filed: Aug. 18, 1977

[30] Foreign Application Priority Data

Aug. 24, 1976 [JP] Japan ............................... 51-101020

[51] Int. Cl.$^2$ ........................ G11B 21/10; G11B 5/52; G11B 21/18
[52] U.S. Cl. .................................... 360/77; 360/107; 360/109
[58] Field of Search ................................. 360/77–78, 360/69–71, 75–76, 84, 131, 134, 27, 64, 107–109

[56] References Cited

U.S. PATENT DOCUMENTS

| | | | |
|---|---|---|---|
| 3,215,772 | 11/1965 | Kirara | 360/70 |
| 3,526,726 | 9/1970 | Corbett et al. | 360/109 |
| 3,585,291 | 6/1971 | Yamakawa | 360/77 |
| 3,663,764 | 5/1972 | Trost et al. | 360/70 |
| 3,787,616 | 1/1974 | Falk | 360/75 |
| 3,838,453 | 9/1974 | Buslik et al. | 360/77 |
| 4,014,040 | 3/1977 | Kornhaas | 360/77 |
| 4,044,388 | 8/1977 | Metzger | 360/77 |
| 4,056,832 | 11/1977 | de Boer et al. | 360/77 |
| 4,080,636 | 3/1978 | Ravizza | 360/77 |

FOREIGN PATENT DOCUMENTS 49-84616  8/1974  Japan.

OTHER PUBLICATIONS

IBM Tech. Disc. Bull., Price, Video Tape Recorder with Oscillating Head, vol. 12, No. 1, Jun. 1969, pp. 33–34.

*Primary Examiner*—Alfred H. Eddleman
*Attorney, Agent, or Firm*—Lewis H. Eslinger; Alvin Sinderbrand

[57] ABSTRACT

A tracking-error correcting system for use in apparatus of the type wherein signal information is recorded in parallel tracks on a record medium. The correcting system is useful for correcting deviations between the scanning path of a transducer which scans the record medium and the parallel tracks. A ramp signal generator generates a periodic ramp signal of substantially constant amplitude and having a duration which is equal to at least a portion of the time required for the transducer to traverse its scanning path. The level of the ramp signal is changed for successive scans of the record medium. An adjustable transducer support is provided to support the transducer in scanning relation to the record medium and is operative to displace the transducer transversely with respect to a parallel track in response to a drive signal applied thereto so as to align the scanning path of the transducer coincidentally with the parallel track. The ramp signal of changing level is used to produce the drive signal. The level of the ramp signal no longer is changed when the scanning path of the transducer is detected to substantially coincide with a parallel track.

24 Claims, 47 Drawing Figures

TRACKING-ERROR CORRECTING SYSTEM FOR USE WITH RECORD MEDIUM SCANNING APPARATUS

BACKGROUND OF THE INVENTION

This invention relates to a tracking-error correcting system for use with record medium scanning apparatus and, more particularly, to such a system wherein the support structure of a scanning transducer is deflected to change the scanning path of that transducer so as to bring the scanning path into substantial coincidence with a record track.

In signal recording and/or reproducing apparatus of the type having a rotary head assembly which scans successive parallel tracks on a record medium, signal information generally is recorded by moving the medium relative to the head assembly and by scanning the relatively moving medium. Although this general type of apparatus is useful for recording analog or digital signals representing various types of information, one particularly advantageous use thereof is to record video signal information. Accordingly, video signal recorders have been developed for use with magnetic tape, magnetic sheets, magnetic discs, and various other types of record media. While the following explanation and description is applicable to different types of recording apparatus which use different media, it is believed that such explanation and description can be significantly simplified by referring to video signal recorders which use magnetic tape, such as the video tape recorder (VTR).

In a typical VTR, one and preferably two record/playback heads are mounted on a suitable rotary assembly, and magnetic tape is helically wrapped about at least a portion of a guide drum within which are disposed the heads for scanning parallel, slant tracks across the surface of the tape. During a normal recording mode, the tape is advanced at a predetermined speed. For purposes of synchronizing the movement of the tape and the rotary movement of the heads, servo control circuitry is provided and is responsive to the vertical synchronizing signal normally provided in the video signal which is recorded. The same synchronization between the relative movement of the tape with respect to the scanning heads is achieved during a reproducing operation. Thus, the servo control circuitry is responsive to control signals which are recorded on the tape during a recording operation as well as to signals which represent the position of the rotary heads during the reproducing operation. These control and position signals serve to adjust the drive speed of the tape and, in some systems, to adjust the rotary speed of the heads. By so controlling the relative movement of the tape with respect to the heads, the heads can scan the same record tracks during a reproducing operation as were scanned during a recording operation. Therefore, during normal tape speed, synchronizing circuitry serves to insure that the scanning path of the heads substantially coincides with the previously recorded record tracks.

Desirably, many VTR systems are provided with modified reproducing operations, such as "stop," "slow-motion" and "fast-motion." In these different reproducing modes, the relative speed of movement between the tape and the scanning heads differs from the relative speed during recording. Consequently, the scanning path of the heads no longer coincides with the record track. Furthermore, the scanning path is not parallel to the record track during these different reproducing modes. Rather, the scanning path is inclined, or angularly disposed, with respect to the record track.

Heretofore, it was thought that, for accuracy in recording and reproducing video signals, the heads should be rigidly mounted to the rotary assembly. For example, if the rotary assembly is formed of rotating arms, the heads should be fixed securely to such arms. In another embodiment, if the rotary assembly is formed of one of the tape-guide drums, that is, if the guide drum assembly is formed of two face-to-face drums, one of which drums rotates, the heads should be securely mounted to the rotary drum. Although the scanning path of such rigidly mounted heads still will not coincide with the record tracks during non-normal (e.g. "stop," "slow-motion" or "fast-motion") reproducing modes, it was thought that if the scanning path could intersect the record track at the approximate mid-point of the record track, then noise or crosstalk due to the non-coincidence of the scanning path and record track could be minimized. This mid-point intersection generally can be achieved by suitably positioning, or moving the tape so as to change the exact position of the scanning path relative to the record tracks as the heads scan the tape.

It has been proposed in U.S. Pat. No. 3,787,616 that a reproducing head can be supported on a leaf assembly that is formed of piezo-electric sections which are responsive to a voltage applied thereto so as to bend or deflect, thereby deflecting the leaf assembly and moving the reproducing head. The purpose of this patent is to eliminate "jitter"; and to this effect, the leaf assembly and reproducing head are moved in a direction such that the head is displaced in the longitudinal direction of the record track, or tape. There is no recognition of correcting for a deviation between the scanning path and the skewed record track in a rotary head record/reproduce system such as a VTR.

OBJECTS OF THE INVENTION

Therefore, it is an object of the present invention to provide an improved tracking-error correcting system which is advantageously used in rotary head recording/reproducing apparatus.

Another object of this invention is to provide a tracking-error correcting system for use in a rotary head recording/reproducing apparatus so as to correct for deviations between the scanning path of a head and a record track on the record medium.

A further object of this invention is to provide a tracking-error correcting system for use in rotary head recording/reproducing apparatus wherein the scanning path of the rotary head is adjusted so as to coincide with a previously recorded record track.

An additional object of this invention is to provide a tracking-error correcting system for use in apparatus wherein a scanning head traverses a scanning path which deviates from a desired path, this deviation being corrected by displacing the support member upon which the head is mounted during a scanning operation.

Yet another object of this invention is to provide a tracking-error correcting system for use in video signal recording/reproducing apparatus wherein noise or distortion which are present during non-normal reproducing modes because of a deviation between the scanning track of the reproducing transducer and the previously recorded record track on the record medium is minimized by eliminating such deviation.

Various other objects, advantages and features of the present invention will become readily apparent from the ensuing detailed description, and the novel features will be particularly pointed out in the appended claims.

SUMMARY OF THE INVENTION

In accordance with this invention, a tracking-error correcting system is provided for use in apparatus of the type wherein signal information is recorded in parallel tracks on a record medium and wherein that record medium is scanned by at least one transducer whose scanning path may not coincide with the parallel tracks during some modes of operation. A ramp signal generator generates a periodic ramp signal of substantially constant amplitude having a duration equal to at least a portion of the time required for the transducer to traverse its scanning path. The level of the ramp signal is changed for each scan of the transducer, and this level-changed ramp signal is used to produce a drive signal. The transducer is supported on an adjustable support which is responsive to the drive signal so as to displace the transducer transversely with respect to the parallel tracks by an amount determined by the amplitude of the drive signal. This displacement of the transducer tends to align its scanning path coincidentally with the parallel tracks. A detector, responsive to the signals reproduced by the transducer, detects when the deviation of the scanning path with respect to the parallel tracks has been minimized so as to prevent further changes in the level of the ramp signal. At that time, the transducer support is driven to maintain the scanning path in substantial coincidence with the parallel tracks.

BRIEF DESCRIPTION OF THE DRAWINGS

The following detailed description, given by way of example, will best be understood in conjunction with the accompanying drawings in which.

DETAILED DESCRIPTION OF CERTAIN PREFERRED EMBODIMENTS

The following detailed description, given by way of example, will best be understood in conjunction with the accompanying drawings. For this purpose of simplification and to facilitate an understanding of the present invention, the following description relates to the environment of a video signal recorder and, more particularly, to a VTR. However, the problems to which the present invention is addressed, and the solution to those problems, as disclosed herein, are not limited solely to video signal recording apparatus. Hence, it should be understood that this description also is applicable to other types of analog signal recording devices, to digital signal recording devices and to other rotary head scanning apparatus which can be used for recording, reproducing, or other purposes.

Figure 1A:
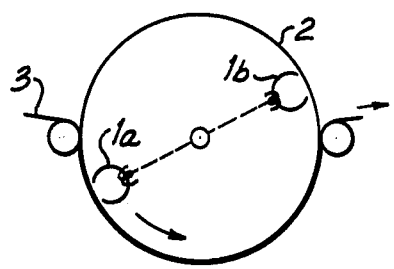
FIG. 1A is a schematic top view of rotary head recording/reproducing apparatus.

Turning now to FIG. 1A, there is schematically illustrated a top view of a typical rotary head scanning device, such as a VTR. AS is conventional, this device is formed with two magnetic record/playback heads 1a, 1b which are adapted for rotation about a central axis. A guide drum 2 is adapted to receive a record medium, such as tape 3, wrapped helically thereabout for at least 180°. Heads 1a and 1b may be mounted on diametrically opposed arms which are rotated so as to scan successive, parallel, skewed tracks across tape 3. Thus, heads 1a and 1b rotate in the direction indicated by the arrow while tape 3 is advanced so as to record signal information thereon.

Figure 1B:
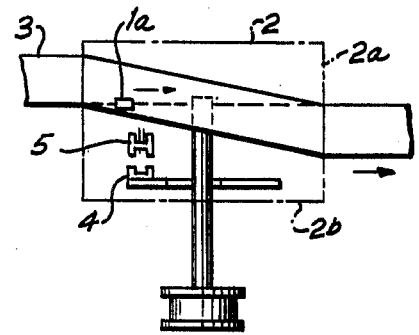
FIG. 1B is a schematic side view of the apparatus shown in FIG. 1A.

Alternatively, and as shown in FIG. 1B, guide drum 2 may be formed of two drums 2a, 2b, disposed in face-to-face configuration and spaced apart so as to define a scanning gap therebetween. Tape 3 is helically wrapped about a portion of the surface of guide drum 2 so that the record tracks recorded by heads 1a, 1b are skewed relative to the longitudinal axis of the tape. When two heads are used, it is appreciated that alternate tracks are recorded thereby. That is, first head 1a records one track then head 1b records the next adjacent track, then head 1a records the following track, and so on. In the alternative structure of FIG. 1B, heads 1a and 1b are mounted on one of drums 2a, 2b, this drum being rotated relative to the other drum such that the heads traverse the aforementioned scanning paths.

During a signal recording operation and during a "normal" signal reproducing operation, the relative speed of tape 3 with respect to heads 1a and 1b is the same. Suitable servo control circuitry (not shown) generally is provided to account for relatively small changes in tape-drive and head-drive motor speeds, tape shrinkage, tape stretching, differences from one apparatus to another, and the like. To this effect, a head-position generator is provided to generate pulses when heads 1a, 1b rotate into predetermined position, such as when head 1a first contacts tape 3, that is, when this head commences its scanning path. Typically, the head-position generator is formed of a magnetic element 4 which is secured to the shaft which rotates heads 1a, 1b so as to rotate with these heads and to pass a fixedly disposed magnetic pick-up sensor 5 for generating a position detecting pulse. As is understood, in typical video recording apparatus, each head records a complete field in a respective record track, and these heads are rotated at a speed of 30 rps. Consequently, the position detecting pulses generated by pick-up sensor 5 having a frequency of 30 Hz.

Desirably, the video signal recording/reproducing apparatus exhibits both a normal reproducing mode and a "non-normal" reproducing mode. In the former, the record medium is advanced at the same speed during a reproducing operation as during a recording operation. However, in the latter, although heads 1a, 1b are rotated at the same rate as during recording, the speed of the record medium is changed. Thus, in a non-normal reproducing mode, the relative speed of movement between the record medium and the heads differs from that during recording. Typical examples of such non-normal reproducing modes are the "stop" mode wherein the record medium is stopped so that the same record track is scanned repetitively by the heads; the "slow-motion" mode wherein the record medium is advanced at a fraction of its normal speed such that the heads scan substantially the same track a plural number of times; and the "fast-motion" mode wherein the record medium is advanced at a much faster speed than during recording. A common problem in each of these non-normal reproducing modes is that the scanning path traversed by the heads no longer coincides with the previously recorded record track. This, of course, is due to the change in the relative speed of movement of the record medium with respect to the scanning heads during such non-normal reproducing mode as compared to the normal recording speed. Because of such deviation, the heads are not aligned correctly with the record track and, therefore, may pick up noise from the guard bands separating successive record tracks or crosstalk from adjacent tracks. Although this problem is associated with all of the non-normal reproducing modes, as aforesaid, it best can be appreciated by considering the "stop" mode.

Figure 2A:
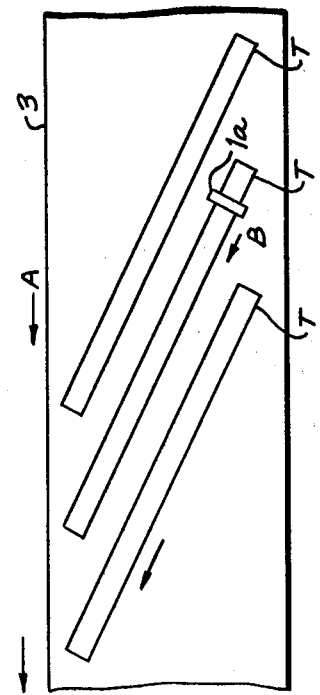
FIGS. 2A–2D represent parallel tracks on a record medium and the relative position of a head scanning path with respect thereto.

Turning to FIG. 2A, there is shown a plurality of parallel tracks T which are recorded on tape 3 during a recording operation. Since tape 3 is advanced in the direction indicated by arrow A, and since the scanning heads, such as head 1a, scan across the surface of tape 3 in the direction indicated by arrow B, it is appreciated that parallel tracks T are formed which are skewed relative to the longitudinal axis of the tape. During a normal reproducing operation, tape 3 once again is moved in the direction of arrow A at the same speed as during recording. Also, heads 1a, 1b are moved in the direction B, also at the same speed as during recording. Hence, the scanning path of, for example, head 1a during a normal reproducing mode is the same as the scanning path of that head during a recording mode. Consequently, the scanning path of head 1a coincides with tracks T, whereby the previously recorded video signals are reproduced accurately.

Figure 2B:
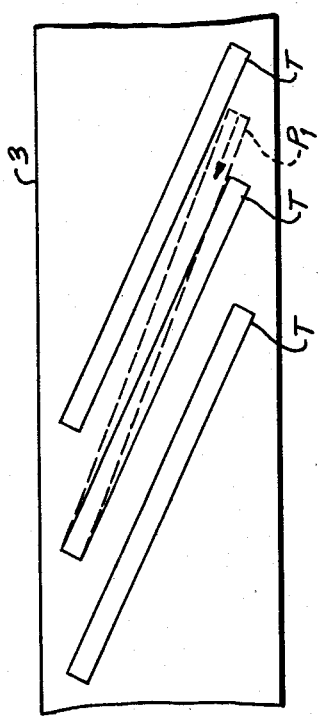
Figure 2C:
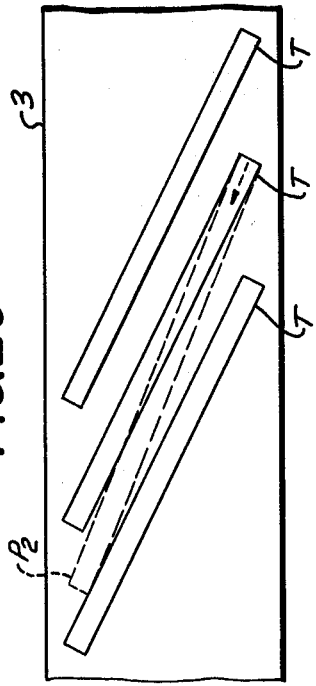
Figure 2D:
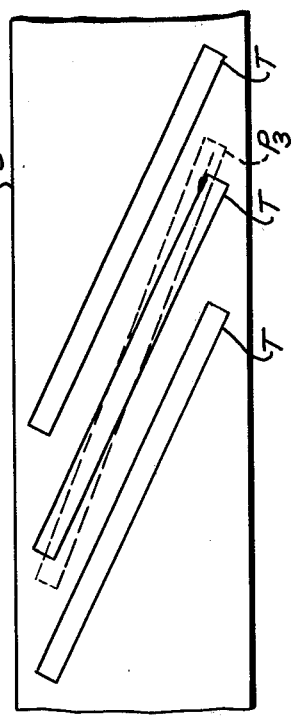

Let it now be assumed that in a "stop" reproducing mode, tape 3 is stopped such that head 1a first contacts the tape at a location intermediate successive tracks T, as shown in FIG. 2B. Since tape 3 is stopped, the scanning path traversed by head 1a no longer coincides with the parallel tracks, as shown. Accordingly, in the assumption represented in FIG. 2B, the scanning path is inclined, or angularly disposed with respect to a record track T such that only the terminal portion of the scanning path coincides with the terminal portion of the record track. If tape 3 had stopped such that the beginning portion of the scanning path coincides with the beginning portion of record track T, the scanning path, shown as $P_2$ in FIG. 2C, would deviate from record track T, as shown. Still further, if tape 3 had stopped such that the central portion of the scanning path, shown as $P_3$ in FIG. 2D, coincides with the central portion of record track T, the deviation between the scanning path and record track is as represented in that figure. Although heads 1a, 1b traverse the respective scanning paths $P_1$, $P_2$ and $P_3$ depending upon the particular position at which tape 3 is stopped, as shown in FIGS. 2B, 2C and 2D, respectively, the signals reproduced by the heads may not be accurate reproductions of the recorded signals because of the illustrated deviations between the scanning path and the record tracks. Thus, when one of the heads deviates to one or the other side of the record track which is to be scanned, noise or crosstalk signals from the guard band or adjacent track are picked up and distort the reproduced signals. The purpose of the present invention is to minimize these deviations. It is thought that if heads 1a and 1b are mounted on adjustable support members, then the position of each head relative to a record track T can be changed while the head scans the tape such that the scanning path thereof coincides with the record track.

In a preferred embodiment, each adjustable head support assembly is formed of a piezoelectric member which is responsive to a voltage applied thereto so as to bend or deflect or in direction perpendicular to the surface thereof. A head support assembly constructed of piezoelectric members is described in U.S. Pat. No. 3,787,616.

Figure 3A:
FIGS. 3A–3C are schematic side views of a piezo ceramic support member which can be used with the present invention.
Figure 3B:
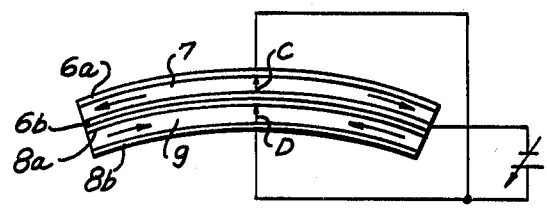
Figure 3C:
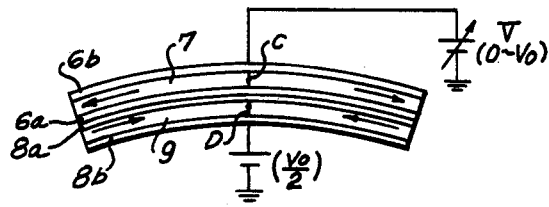

A head support assembly which can be used with the present invention is shown schematically in FIGS. 3A-3C. This assembly is formed of a pair of leaf members 7 and 9, each being constructed of piezo-ceramic material whose directions of polarization are represented by arrows C and D, respectively. The opposite surfaces of piezo-ceramic leaf member 7 are plated with electrodes 6a and 6b, respectively; and the opposite surfaces of piezo-ceramic member 9 likewise are plated with electrodes 8a and 8b, respectively. If piezo-ceramic members 7 and 9 overlie each other such that electrodes 6b and 8a are in contact, and if a variable voltage is applied across the respective members, as shown in FIG. 3B, then piezo-ceramic member 7 tends to expand in its lengthwise direction while piezo-ceramic member 9 tends to compress. As a result of these oppositely-acting forces, the head support assembly bends, or deflects, by an amount which is a function of the strength of the electric field applied across each member. If the polarity of the electric field is reversed, the direction in which the assembly bends, or deflects, correspondingly is reversed.

If the direction of polarization of the piezo-ceramic members is made opposite to each other, that is, if electrode 6a of member 7 now contacts electrode 8a of member 9, the manner in which voltage is applied to the assembly to effect a displacement thereof is as shown in FIG. 3C. Hence, a voltage need not be applied to the electrodes in common contact with each other. Instead, if a bias voltage is applied to electrode 8b and if a variable voltage is applied to electrode 6b, then the illustrated assembly will bend in a downward direction if the variable voltage is less than the bias voltage, and will bend in an upward direction if the variable voltage exceeds the bias voltage. For convenience, it is assumed that the bias voltage has a magnitude $V_o/2$ while the drive voltage is variable between 0 and $V_o$.

Figure 4A:
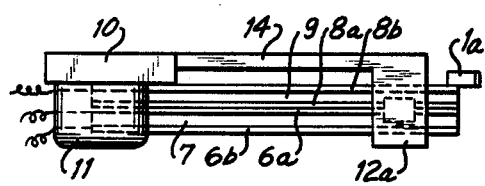
FIG. 4A is a side view of one embodiment of a head support assembly which can be used with the present invention.
Figure 4B:
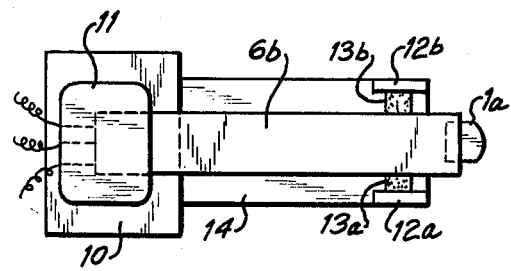
FIG. 4B is a bottom view of the assembly shown in FIG. 4A.

A practical embodiment of a head support assembly formed of the leaf members in FIGS. 3A–3C is illustrated in FIGS. 4A and 4B, which are side and bottom views, respectively. A mounting base 10 receives the piezo-ceramic members which may be secured thereto by a suitable adhesive 11. The leaf members extend outward from base 10 and magnetic head 1a or 1b is mounted on the free end thereof. Mounting base 10 may be secured to the rotary arms of the rotating assembly for the magnetic heads or, alternatively, may be secured to, for example, the bottom surface of guide drum 2a (FIG. 1B). In either event, the leaf members extend in a direction outward from the rotary axis of the heads.

Preferably, damping members 13a and 13b are provided to damp free or resonant oscillation of the leaf members which may be caused by the forces exerted in response to the bending voltages applied to the respective electrodes. For example, these forces may bend the leaf members from a starting position to an ending position as the head mounted thereon traverses its scanning path, and then return the leaf members to their starting position in preparation for another scan. The damping members are intended to damp oscillation of the leaf members caused by this bending. Accordingly, damping members 13a and 13b are attached to tabs 12a and 12b, respectively, these tabs extending from damping member mounting plate 14 which, as shown, extends outwardly from mounting base 10. Desirable damping action is achieved when damping members 13a and 13b are pressed between the sides of the leaf members and tabs 12a and 12b with suitable force to prevent oscillation but not to prevent deflection of the leaf members in response to the voltage applied thereto. As also shown, conducting leads are secured to the respective electrodes of the leaf members for receiving the deflecting voltage.

During the recording operation, heads 1a and 1b should remain in a normal, undeflected position. Hence, during recording, a deflecting or drive voltage is not applied to the head support assembly. However, during a non-normal reproducing mode, it is preferred that a drive voltage be applied. For example, if the scanning path relative to a record track corresponds to scanning path $P_1$ (FIG. 2B), the drive voltage should decrease from a maximum level at the start of the scanning path to a zero level at the end of the scanning path. If the scanning path relative to a record track corresponds to scanning path $P_2$ (FIG. 2C), then the drive voltage applied to the head support assembly should increase from a zero level at the start of the scanning path to a maximum level at the end of the scanning path. If the scanning path relative to a record track corresponds to scanning path $P_3$ (FIG. 2D), then the drive voltage should decrease from a maximum level at the start of the scanning path to a zero level at the mid-point thereof and then increase to a maximum level at the end of the scanning path. A suitable drive voltage for deflecting the head support assembly to correct the scanning path deviations shown in FIGS. 2B–2D should have a ramp or triangular waveform. For the particular deviation shown in FIG. 2D, and for piezo-ceramic leaf assembly shown in FIG. 3C, the ramp waveform applied as the variable drive voltage V should have a mid-point amplitude equal to the bias voltage ($V_o/2$).

Figure 5:
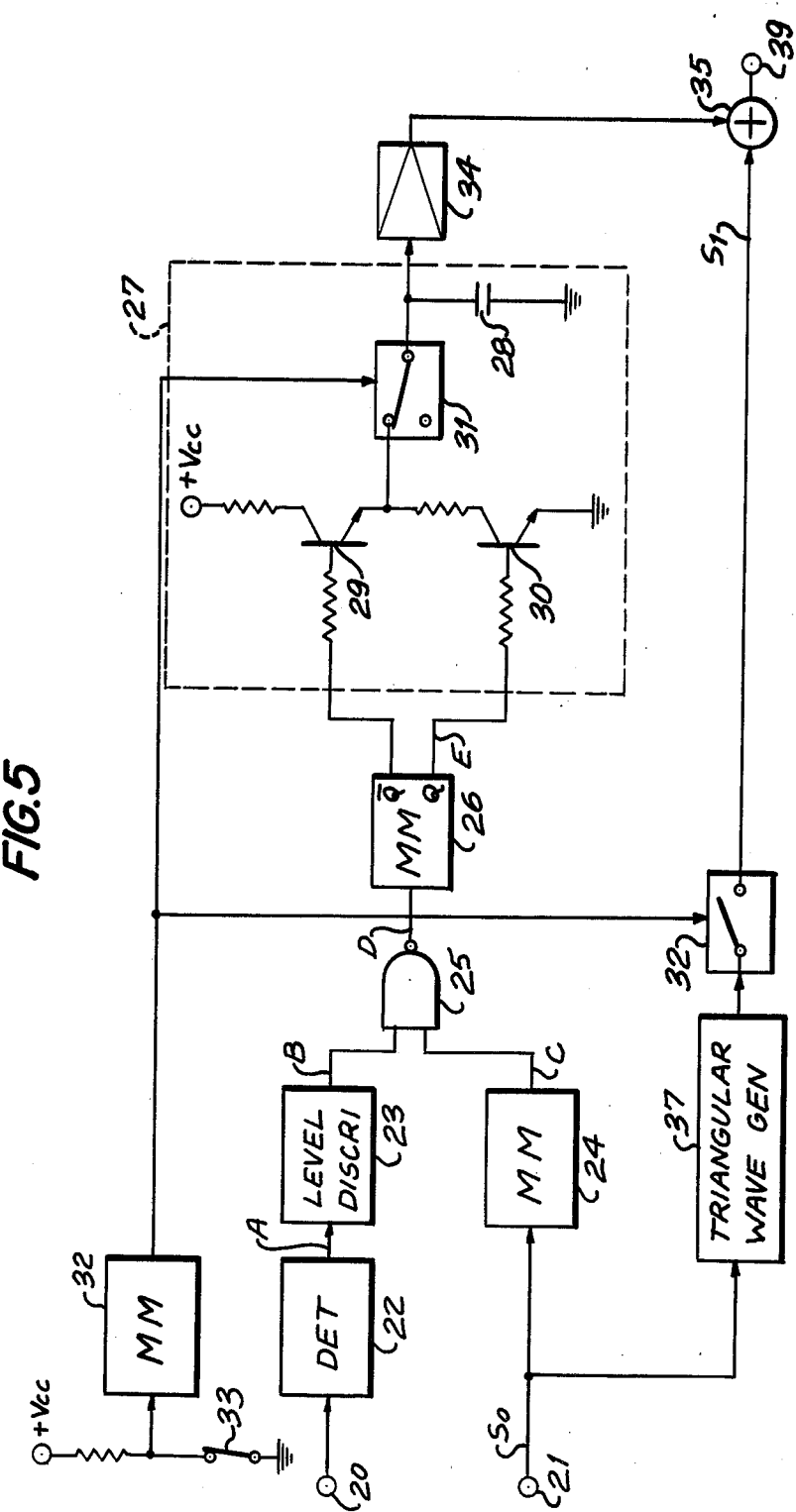
FIG. 5 is a partial block, partial schematic diagram of a tracking-error correcting system.

Apparatus for generating a suitable drive voltage for application to the piezo-ceramic leaf assembly shown in FIG. 3C for correcting deviations in the scanning path relative to a record track during a non-normal reproducing mode is shown in FIG. 5. The illustrated apparatus is comprised of an envelope detector 22 having an input adapted to receive the signals reproduced by, for example, head 1a and applied to input terminal 20. Envelope detector 22 is coupled to a level discriminator 23 which, in turn, is coupled through a NAND gate 25 to a monostable multivibrator, or one-shot circuit 26. Another input of NAND gate 25 is coupled to a monostable multivibrator 24 whose trigger input is adapted to receive head change-over pulses (to be described) applied to input terminal 21.

Monostable multivibrator 26 is of the re-triggerable type having a pair of output terminals Q and $\overline{Q}$, respectively. These output terminals are coupled to a bias signal generator 27 which includes a storage device, shown as capacitor 28, which is adapted to have a bias signal stored thereacross, which, as will be explained, determines the intersection of the scanning path traversed by head 1a with the approximate mid-point of a record track T. That is, the bias signal stored across capacitor 28 is controlled to have a value establishing scanning path $P_3$ shown in FIG. 2D. In particular, bias signal generator 27 is comprised of a charging circuit formed of transistor 29 whose collector-emitter circuit is connected in series between a source of operating voltage $V_{cc}$ and, through a switching circuit 31, to capacitor 28; and also a discharging circuit formed of transistor 30 whose collector-emitter circuit is connected in series, and through switching circuit 31, between capacitor 28 and a reference potential, such as ground. The base electrode of transistor 29 is coupled to output terminal $\overline{Q}$ of monostable multivibrator 26 and the base electrode of transistor 30 is coupled to output terminal Q.

The bias signal stored across capacitor 28 is supplied through an amplifier 34 to a combining circuit 35, such as a mixing circuit, summing circuit, or the like. Another input to combining circuit 35 is supplied thereto by a ramp signal generator 37, such as a triangular wave generator, this generator being coupled to input terminal 21 and synchronized with the aforementioned head change-over pulses. As shown, a switching circuit, or gate 38 selectively applies the ramp signal generated by ramp signal generator 37 to combining circuit 35. The output of this combining circuit is coupled to an output terminal 39 whereat the deflecting, or drive voltage is derived.

Switch circuits 31 and 38 are adapted to be actuated when a particular non-normal reproducing mode is initiated. For this purpose, each switch circuit includes a control input coupled in common to a monostable multivibrator 32 which, in turn, is triggered when a switch 33 is closed. As one example thereof, switch 33 may be closed when a "stop" or still motion is selected. When monostable multivibrator 32 is triggered, it generates an output pulse of predetermined duration for closing switch circuit 31 and opening switch circuit 38 for that duration. At the termination of this pulse, switch circuit 31 is opened and switch circuit 38 is closed.

The operation of the system illustrated in FIG. 5 will be described with the assumption that the video recording/reproducing apparatus is to be operated in its "stop" or still motion mode. Thus, movement of the record medium is stopped and heads 1a, 1b (FIGS. 1A, 1B) scan the record medium. As is now understood, the scanning path traversed by each head deviates from the previously recorded record track. Nevertheless, the video signals reproduced by, for example, head 1a are applied to input terminal 20. The specific format of these video signals forms no part of the present invention, and such signals may be frequency-modulated video signals, or chrominance signals, luminance signals, or composite color television signals. Envelope detector 22 produces an output signal proportional to the detected envelope or signal level of the reproduced video signals. Hence, if head 1a passes over a portion of a record track T, the output of envelope detector 22 is greater than when head 1a passes over, for example, a guard band. Level discriminator 23 receives the output signal from envelope detector 22 and compares this signal to a threshold level $V_t$. In one embodiment, if the envelope-detected signal is less than this threshold level, level discriminator 23 produces a signal of relatively higher magnitude, such as a binary "1". Conversely, if the envelope-detected signal level exceeds the threshold level, level discriminator 23 produces a signal having a relatively lower magnitude, such as a binary "0".

Figure 6A:
FIGS. 6A–6B are waveform diagrams which are useful in understanding the operation of the system shown in FIG. 5.

As mentioned above, head change-over pulses are applied to input terminal 21. These pulses, shown in FIG. 6A, coincide with the scanning of the record medium by the respective heads 1a and 1b. As an example, if a head-position pulse is generated by, for example, detector 5 (FIG. 1B), this head-position pulse may trigger a monostable multivibrator (not shown) to produce the change-over pulses $S_0$ shown in FIG. 6A. Preferably, this pulse has a 50% duty cycle such that the duration of the positive portion is coextensive with the scanning of the record medium by head 1a, and the duration of the negative portion is coextensive with the scanning of the record medium by head 1b. The positive transition of change-over pulses $S_0$ triggers monostable multivibrator 24 to produce an output pulse of predetermined duration.

The output of level discriminator 23 and the output of monostable multivibrator 24 both are supplied to NAND gate 25. Hence, this NAND gate produces a binary "0" if the output pulse produced by monostable multivibrator 24 coincides in time with the binary "1" produced by the level discriminator when the envelope-detected signal level is less than the threshold level $V_t$. This binary "0" triggers monostable multivibrator 26.

When monostable multivibrator 26 assumes it stable state, a binary "1" is produced at its $\overline{Q}$ output, thereby turning on transistor 29. However, when this monostable multivibrator is triggered, it assumes its unstable state and supplies a binary "1" from its Q output to turn on transistor 30. For a purpose soon to become apparent, monostable multivibrator 26 has a time constant which is greater than a frame interval, and is retriggerable so as to re-start a timing operation.

Ramp signal generator 37 is triggered in response to the positive transition in change-over pulses $S_0$. The ramp signal generated by generator 37 is of constant amplitude. For the purpose of this description, a "constant amplitude" ramp signal means that the amplitude of the ramp signal increases continuously and at a constant rate with no abrupt changes, or steps, in its amplitude. The duration of this ramp signal is substantially equal to the time for head 1a to transverse its scanning path. At the conclusion of the duration of this ramp signal, the signal may return abruptly or rapidly to its initial level or, alternatively, may gradually return to its initial level so as to present a complementary ramp waveform. If it is assumed that the ramp signal has a positive slope, then the complementary ramp signal will have a negative slope, the two signals thus forming a triangular waveform. As may be recognized by one of ordinary skill in the art, ramp signal generator 37 may be of conventional construction and may include one integrating circuit so as to form a ramp waveform, or two integrating circuits so as to form a triangular waveform. For the purpose of this discussion, it will be assumed that the ramp signal is of triangular waveform such as $S_1$ shown in solid lines in FIG. 6B.

Accordingly, the deflecting or drive signal applied to output terminal 39 includes the ramp signal component produced by ramp signal generator 37 and a bias signal component, such as the DC bias signal stored across capacitor 28. These components are added in combining circuit 35.

If the piezo-ceramic head support assembly corresponds to the embodiment shown in FIG. 3C, the leaf members bend in one direction when the drive signal is less than the bias voltage $V_0/2$ and bend in the opposite direction when the drive signal is greater than this bias voltage. If the bias voltage is equal to the midlevel amplitude of ramp signal $S_1$, then the leaf assembly will be deflected in one direction to a greater extent at the start of this ramp signal, which deflection is reduced to zero at the mid-point of the ramp signal and then gradually increased in the opposite direction until maximum deflection is reached at the termination of the ramp signal. Of course, during the negative portion (or slope) of the ramp signal, the leaf assembly is similarly deflected but in the opposite directions. Thus, in order to correct the deviation shown in FIG. 2B, and assuming that the bias voltage $V_0/2$ is of the magnitude shown in FIG. 6B, ramp signal $S_1$ should have the waveform shown in broken lines in FIG. 6B. This means that head 1a, for example, is deflected by a maximum amount at the start of its scanning path, this deflection decreasing to zero at the end of the scanning path. Similarly, in order to correct the deviation shown in FIG. 2C, ramp signal $S_1$ should have the waveform shown by the one-dot chain line of FIG. 6B. With this waveform, the deflection of head 1a increases from a zero level at the start of its scanning path to a maximum level at the end of the scanning path. Also, in order to correct the deviation shown in FIG. 2D, ramp signal $S_1$ should have the waveform shown by solid lines in FIG. 6. With this waveform, the deflection of head 1a decreases from a maximum level at the start of the scanning path to a zero level at the mid-point of the scanning path and then increases in the opposite direction to a maximum level at the end of the scanning path. With waveforms of the type shown in FIG. 6B, the respective scanning paths of head 1a, as shown in FIGS. 2B, 2C and 2D, respectively, are adjusted so as to coincide with record track T. Of course, the particular ramp signal waveform is dependent upon the position at which tape 3 is stopped which, in turn, determines the starting point of the scanning path.

Figure 6B:
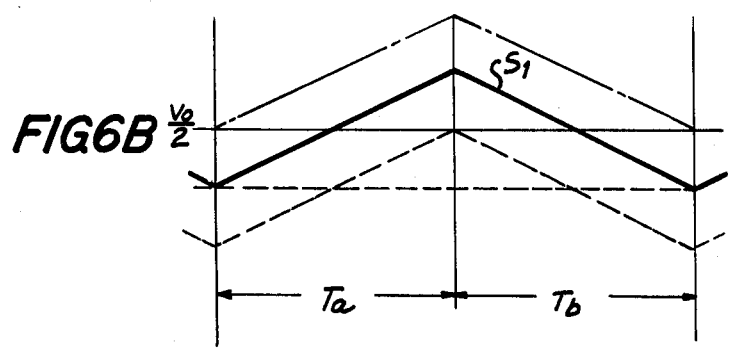

In the foregoing description, the particular level of ramp signal $S_1$, that is, the respective levels shown by the broken line, one-dot chain line and solid line waveforms shown in FIG. 6B, is determined by the bias signal stored across capacitor 28. If it is assumed that the mid-point or average amplitude of the ramp signal produced by ramp signal generator 37 is zero, then the addition of the bias signal to this ramp signal establishes the particular level of the latter as applied to the piezo-ceramic leaf assembly. That is, and assuming that the solid horizontal reference line in FIG. 6B is equal to a bias signal voltage of $V_0/2$, the ramp signal $S_1$ will exhibit the waveform shown by the broken line if the bias signal across capacitor 28 is less than $V_0/2$, the ramp signal will exhibit the waveform shown by the solid line if the bias signal across capacitor 28 is equal to $V_0/2$, and the ramp signal will exhibit the waveform shown by the one-dot-chain line if the bias signal across capacitor 28 is greater than $V_0/2$.

Figure 7A:
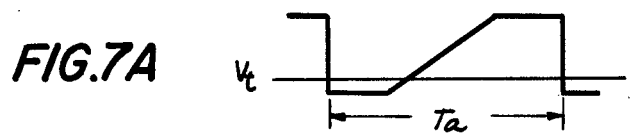
FIGS. 7A–7E are waveform diagrams which are useful in understanding the operation of the system shown in FIG. 5.
Figure 7B:
Figure 7C:
Figure 7D:
Figure 7E:
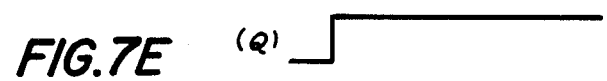

The manner in which the bias signal is produced across capacitor 28 for each of the scanning path deviation conditions shown in FIGS. 2B, 2C and 2D is explained with reference to FIGS. 7, 8 and 9, respectively. FIG. 7A illustrates the envelope-detected signal produced by detector 22. As is apparent, the envelope-detected signal level is less than threshold level $V_t$ at the beginning of the scanning path, and then, as the scanning path approaches record track T, the envelope-detected signal level increases. Accordingly, level discriminator 23 produces an output pulse as shown in FIG. 7B. That is, this pulse is a binary "1" until the envelope-detected signal level exceeds threshold level $V_t$. Since a positive transition is present in the change-over pulses $S_0$ at the beginning of the scanning path, monostable multivibrator 24 produces the output shown in FIG. 7C. When the pulses of FIGS. 7B and 7C are applied to NAND gate 25, the NAND gate supplies the pulse shown in FIG. 7D to trigger monostable multivibrator 26, as shown in FIG. 7E. Thus, transistor 30 is turned on and transistor 29 is turned off. If it is assumed that a "stop" mode has been selected such that switch 33 is closed and monostable multivibrator 32 is triggered, switch circuit 31 also is closed so that the voltage which had been stored across capacitor 28 now is discharged through switch 31 and conducting transistor 30. The collector resistor connected to transistor 30 combines with the capacitance of capacitor 28 to establish a discharge time constant. Thus, the bias signal across capacitor 28 is reduced, and this reduced bias signal is supplied through combining circuit 35 to output terminal 39 as the drive signal for the piezo-ceramic leaf assembly shown in FIG. 3C.

As the bias signal across capacitor 28 is reduced, it has the effect of deflecting the head support assembly such that, when viewed in FIG. 2B, the scanning path of the head is shifted from right to left until it obtains the relative position shown, for example, as scanning path $P_2$ in FIG. 2C. However, so long as the scanning path $P_1$ is such that the envelope-detected signal level produced at the beginning portion of the scanning path is less than $V_t$, retriggerable monostable multivibrator 26 maintains transistor 30 on to continue to discharge capacitor 28.

Figure 8A:
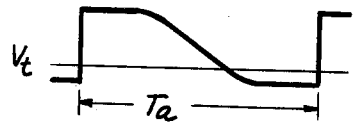
FIGS. 8A–8E are waveform diagrams which are useful in understanding the operation of the system shown in FIG. 5.
Figure 8B:
Figure 8C:
Figure 8D:
Figure 8E:

When the scanning path of, for example, head 1a is as represented by the scanning path $P_2$ in FIG. 2C, the envelope-detected signal produced by envelope detector 22 appears as shown in FIG. 8A. Since this envelope-detected signal level remains above threshold level $V_t$ until the end portion of the scanning path, level discriminator 23 produces the output pulse shown in FIG. 8B. Therefore, NAND gate 25 is not supplied with coinciding pulse signals and, therefore, supplies a binary "1" to monostable multivibrator 26, this monostable multivibrator remaining in its stable state so as to supply a binary "1" from its $\overline{Q}$ output to transistor 29. This turns on transistor 29 so as to charge capacitor 28. Hence, the voltage across this capacitor increases so as to increase this bias signal which is supplied through combining circuit 35 to output terminal 39 as the drive signal for the piezo-ceramic leaf assembly. As this drive signal now increases, the head support member is deflected in a direction so as to shift scanning path $P_2$ from left to right, as viewed in FIG. 2C, tending to return this scanning path to the path illustrated as $P_1$ in FIG. 2B.

Therefore, as capacitor 28 is charged and discharged, depending upon the relative location of the scanning path ($P_1$ or $P_2$) with respect to record track T, the average bias signal across capacitor 28 tends to deflect the head support member to cause the scanning path to intersect with the record track at approximately the mid-point thereof, as shown in FIG. 2D.

Figure 9A:
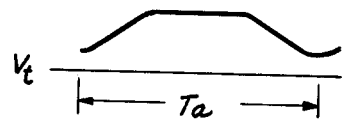
FIGS. 9A–9E are waveform diagrams which are useful in understanding the operation of the system shown in FIG. 5.
Figure 9B:
Figure 9C:
Figure 9D:
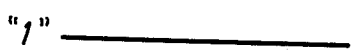
Figure 9E:
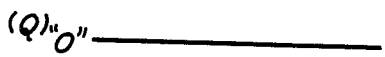

If it is assumed that when the "stop" mode is selected, tape 3 is stopped such that the scanning path is as represented by path $P_3$ shown in FIG. 2D, the envelope-detected signal produced by envelope detector 22 is as shown in FIG. 9A. Since this envelope-detected signal level exceeds threshold level $V_t$, level discriminator 23 does not apply a pulse signal to NAND gate 25. Hence, monostable multivibrator 26 remains in its stable state to apply a binary "1" to transistor 29. Consequently, capacitor 28 is charged in a manner similar to the charging of capacitor 28 described with respect to FIGS. 2C and 8. Thus, as the bias signal increases, scanning path $P_3$ is shifted relative to track T from left to right until the envelope-detected signal produced by envelope detector 22 is reduced below threshold level $V_t$. At that time, monostable multivibrator 26 is triggered so as to turn off transistor 29 and turn on transistor 30. This, in turn, discharges capacitor 28, resulting in a shift from right to left of the scanning path. Thus, it is appreciated that scanning path $P_3$ effectively fluctuates about the position shown in FIG. 2D.

In view of the operation described above, it can be seen that the bias signal across capacitor 28 assumes the level $V_0/2$, shown as the solid reference line in FIG. 6B. Thus, because of this signal, which is the only drive signal applied to the head support assembly when switch 33 is closed and monostable multivibrator 32 produces its output pulse, the head support assembly is deflected so as to establish scanning path $P_3$ as shown in FIG. 2D.

At the conclusion of the pulse produced by monostable multivibrator 32, switch circuit 31 opens and switch circuit 38 closes. Thus, the bias signal is maintained across capacitor 28. That is, both the charge and discharge paths are disconnected therefrom by the opening of switch 31. At the same time, the closing of switch 38 supplies the ramp signal $S_1$ produced by ramp signal generator 37 to combining circuit 35. This means that the drive signal now applied to the head support assembly is as shown by the solid lines in FIG. 6B. Consequently, scanning path $P_3$ is adjusted in response to this drive signal so as to coincide with record track T. That is, during the first half of the scanning path, the drive signal is less than $V_0/2$ so as to deflect the head support assembly in a direction which shifts scanning path $P_3$ from right to left as viewed in FIG. 2D. Also, during the second half of the scanning path, the drive signal is greater than $V_0/2$ so as to deflect the head support assembly in the opposite direction whereby the second half of scanning path $P_3$ is shifted from left to right.

In the system shown in FIG. 5, the amplitude of the ramp signal produced by ramp signal generator 37 is constant, as shown in FIG. 6B. This amplitude is selected as a function of the maximum deviation between the beginning and end portions of scanning path $P_3$ (FIG. 2D) and track T. It is this amplitude which is needed to deflect the head support assembly sufficiently so as to bring scanning path $P_3$ into coincidence with track T. However, the piezo-ceramic material may alter its response to the drive signal applied thereto as a function of aging, temperature, and the like. This means that the ramp signal $S_1$ of constant amplitude may not be sufficient in some instances to adjust the scanning path to coincide with the record track. Consequently, even with the system shown in FIG. 5, there still is the possibility of a tracking error during non-normal reproducing modes. Furthermore, there is the possibility that the bias signal stored across capacitor 28 may not be sufficient to deflect the head support assembly so as to establish scanning path $P_3$ in the configuration shown in FIG. 2D, that is, wherein this scanning path intersects record track T at approximately the midpoint of the record track. Yet another disadvantage of the illustrated system is that the response time, that is, the time required to correct for tracking errors, may not be sufficiently fast. That is, the tracking error may be present for a number of successive scans.

Figure 10:
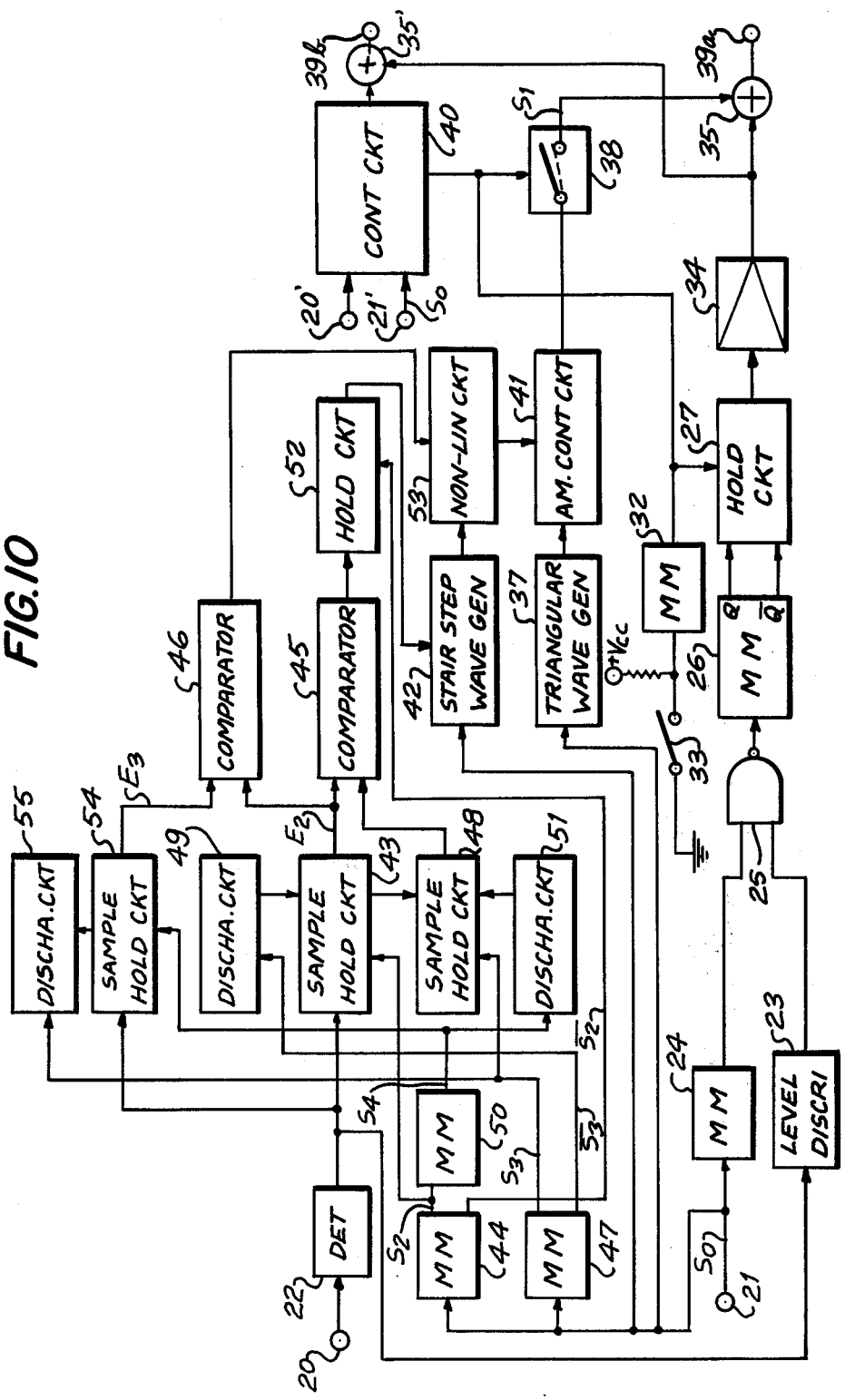
FIG. 10 is a block diagram of a preferred embodiment in accordance with the present invention.

The embodiment shown in FIG. 10 overcomes the aforenoted disadvantages which may be associated with the system of FIG. 5. In FIG. 10, many of the same elements are identified by the same reference numerals used in FIG. 5. Thus, envelope detector 22, level discriminator 23, monostable multivibrator 24, NAND gate 25, monostable multivibrator 26, bias signal generator 27, monostable multivibrator 32, combining circuit 35, ramp signal generator 37 and switch circuit 36 are substantially similar. In the interest of simplification, further description of these components is not provided.

The function of the improved system shown in FIG. 10 is to selectively change the level of the ramp signal produced by ramp signal generator 37. As used in this description, to change the level of the ramp signal means to increase or decrease the amplitude of the ramp signal abruptly, or discontinuously, at some point and, after such level change, to maintain a constant amplitude of the ramp signal at the new, or changed level. That is, by changing the level of the ramp signal, the difference between the minimum and maximum portions thereof is changed. To increase the level of the ramp signal is to increase this difference; and to decrease the level of the ramp signal is to decrease this difference. In accordance with the system shown in FIG. 10, the level of ramp signal $S_1$ is selectively changed as a function of the deviation between the scanning path and the record track. That is, relatively large changes in the amplitude of the ramp signal are made when the deviation is large, but these changes in the level of the ramp signal are made smaller as the deviation is reduced. In this manner, tracking errors can be corrected rapidly and accurately and, moreover, such errors can be corrected even in the event of aging or temperature changes which may affect the piezoceramic leaf assembly.

With specific reference to FIG. 10, the improved tracking-error correcting system includes sampling circuit 43, which may comprise a conventional sample-and-hold circuit, a storage circuit 48, which also may comprise a sample-and-hold circuit, a comparator 45, a staircase generator 42 and a level changing circuit 41. Sampling circuit 43 is adapted to sample the level of the envelope-detected signal produced by envelope detector 22 at a predetermined time, or location along the scanning path transversed by head 1a. Storage circuit 48 is adapted to store the level sampled by sampling circuit 43, and comparator 45 is adapted to compare a presently sampled envelope-detected signal level with the immediately preceding sample of the envelope-detected signal. Accordingly, the signal input of sampling circuit 43 is coupled to envelope detector 22 and a sampling pulse input terminal of circuit 43 is coupled to a monostable multivibrator 44 for receiving a sampling pulse $S_2$. The signal input of storage circuit 48 is coupled to an output of sampling circuit 43, and the storage circuit also includes a sample pulse input terminal coupled to a monostable multivibrator 47 for receiving a sampling pulse $S_3$. The signal outputs of sampling circuit 43 and storage circuit 48 are coupled to respective inputs of comparator 45. Although FIG. 10 shows a separate signal output of sampling circuit 43 coupled to the signal input of storage circuit 48, it should be readily appreciated that the signal output of this sampling circuit which is coupled to comparator 45 also may be coupled to the signal input of storage circuit 48.

Monostable multivibrators 44 and 47 are coupled to input terminal 21 and are adapted to be triggered to their respective unstable states in response to the head change-over pulses $S_0$ which are received at terminal 21. More particularly, monostable multivibrator 44 is triggered by the positive transition in change-over pulse $S_0$ so as to produce a positive sampling pulse $S_2$ of predetermined duration. Monostable multivibrator 47 is triggered by the negative transition in change-over pulse $S_0$ and is adapted to produce sampling pulse $S_3$ of predetermined duration. Monostable multivibrators 44 and 47 also include complementary sampling pulse output terminals whereat sampling pulses complementary to sampling pulses $S_2$ and $S_3$, respectively, are produced. These complementary sampling pulses are represented as pulses $\overline{S_2}$ and $\overline{S_3}$, respectively.

Comparator 45 may comprise a conventional amplitude or level comparing circuit, such as a differential amplifier. As one example of the signal produced by comparator 45, if the signal level sampled by sampling circuit 43 exceeds the signal level stored in storage circuit 48, a relatively higher signal level, for example, a binary "1" is produced. Conversely, if the signal level sampled by sampling circuit 43 is less than the signal level stored in storage circuit 48, comparator 45 produces a binary "0". The output of comparator 45 is coupled to a storage circuit 52 which, for example, may comprise a sampling circuit of a type similar to sampling circuit 43. In this regard, complementary sampling pulse $\overline{S_2}$ are applied to a sampling pulse input of storage circuit 52 from monostable multivibrator 44. Storage circuit 52 is coupled to staircase generator 42 so as to supply a selective enable/inhibit signal to the staircase generator. That is, if a binary "1" is stored in storage circuit 52, staircase generator 42 is enabled to continue the production of the staircase waveform. However, if storage circuit 52 stores a binary "0", further operation of staircase generator 42 is inhibited, and the output level produced thereby is maintained at its output terminal. As shown, the input of staircase generator 42 is coupled to terminal 21 and is responsive to the positive transition of change-over pulse $S_0$ to increment the output signal produced thereby. That is, at the beginning of each scanning path traversed by head 1a, the amplitude of the staircase signal produced by the staircase generator is increased by a predetermined increment such that, over a period of time, the staircase waveform is produced having successive step increases.

The output of staircase generator 42 is coupled through a non-linear circuit 53 to a control input of level changing circuit 41. The purpose and operation of non-linear circuit 53 will be described below. As mentioned previously, level changing circuit 41 is adapted to change the level of the ramp signal produced by ramp signal generator 37. Accordingly, level changing circuit 41 may comprise a gain-controlled amplifier whose gain is determined by the staircase control signal applied to its control input. That is, the gain of this amplifier will be increased by an amount proportional to each step increase in the amplitude of the staircase signal. As an alternative, the gain-controlled amplifier may be of the type whose gain is decreased by an amount proportional to each step increase in the amplitude of the staircase signal. As a further alternative, level changing circuit 41 may comprise a controllable attenuator whose attenuation either is selectively increased or decreased by an amount proportional to the step increase in the amplitude of the staircase signal which is applied thereto as a control signal. Thus, it may be appreciated that if level changing circuit 41 comprises a gain-controlled amplifier or a controllable attenuator, the function of the level changing circuit is to change the level of the ramp signal in one direction in response to the control signal applied thereto from staircase generator 42. For the purpose of this description, a change in the level of the ramp signal in one direction means that the level of the ramp signal is increased only or, in the alternative, is decreased only in response to the control signal. Thus, as the amplitude of the staircase signal increases in successive steps, the level of the ramp signal correspondingly increases (or decreases) successively. The output of level changing circuit 41 is coupled via switch circuit 38 to combining circuit 35. The switch circuit and combining circuit shown in FIG. 10 are substantially similar to the respective circuits described hereinabove with respect to FIG. 5.

Optionally, sampling circuit 43 and storage circuit 48 are provided with respective clear or reset circuits 49 and 51. The purpose of these clear circuits is to remove or "erase" the contents of the sampling circuit and storage circuit in preparation for a subsequent sampling and storage operation, respectively. Accordingly, for the embodiments wherein sampling circuit 43 and storage circuit 48 include capacitors across which sampled signal levels are stored, clear circuits 49 and 51 each may comprise a discharge circuit that is selectively actuated to discharge, or "clear", the storage capacitor. Clear circuit 49 is actuated in response to complementary sampling pulse $\bar{S}_3$, and clear circuit 51 is actuated in response to a sampling pulse $S_4$. In the illustrated embodiment, sampling pulse $S_4$ is produced by a monostable multivibrator 50 which is triggered to its unstable state in response to the negative transition in sampling pulse $S_2$. Hence, the trigger input of monostable multivibrator 50 is coupled to the output of monostable multivibrator 44.

The purpose of non-linear circuit 53 is to selectively vary the step increases of the staircase signal produced by staircase generator 42 as a function of the deviation between the scanning path traversed by head 1a and a record track T. That is, the step increases in the amplitude of the staircase signal preferably are of greater magnitude when the scanning path deviates greatly from the record track; but the magnitude of the step increases is reduced as the scanning path approaches coincidence with the record track. Since the staircase signal is supplied through non-linear circuit 53 as the level control signal for level changing circuit 41, this means that the ramp signal is subjected to a smaller change in level as the scanning path approaches coincidence with the record track. Non-linear circuit 53 may comprise a variable gain amplifier having a gain-controlling input adapted to receive a control signal for determining the gain thereof, and thus the magnitude of the step increase in the amplitude of the staircase signal. This gain controlling signal is adapted to be produced by a comparator 46, which may be similar to comparator 45, having a first input coupled to sampling circuit 43 and a second input coupled to another sampling circuit 54. Sampling circuit 54 may be similar to sampling circuit 43 and is adapted to sample the level of the envelope-detected signal produced by envelope detector 22 when head 1a reaches the approximate mid-point of its scanning path. Accordingly, sampling circuit 54 includes a sampling pulse input terminal adapted to receive sampling pulse $S_4$ produced by monostable multivibrator 50. Preferably, sampling circuit 54 is energized in response to a positive transition in sampling pulse $S_4$. A clear circuit 55, similar to aforedescribed clear circuits 49 and 51, is coupled to clear or reset sampling circuit 54, and is responsive to sampling pulse $S_3$ produced by monostable multivibrator 47 in order to perform this operation.

As will be appreciated, comparator 46 functions to compare the level-detected signal at the beginning of the scanning path traversed by head 1a with the level-detected signal at the mid-point of the scanning path. These respective level-detected signals will have approximately the same envelope levels when the scanning path of head 1a is substantially coincident with a record track. In the absence of such coincidence, that is, when the scanning path deviates from the record track, the output of comparator 46 controls the gain of non-linear circuit 53. Hence, when coincidence (or substantial coincidence) is attained, the gain of non-linear circuit 53 is maintained substantially constant.

The selective level-changed ramp signal produced by ramp signal generator 37 and level changing circuit 41 is combined in combining circuit 35 with the DC bias signal produced by bias generator 27. In a preferred embodiment, separate selective level-controlled signals are produced for the respective heads 1a and 1b. However, only a single control circuit for producing the DC bias signal need be provided for both heads. Consequently, separate combining circuits 35 and 35' are provided for receiving the separate selective level-controlled signals and for combining same with the commonly produced DC bias signal. It is, therefore, appreciated that control circuit 40 (FIG. 10) includes circuitry similar to the above-described circuitry for producing the selective level-changed ramp signal for adjusting the scanning path of head $1b$. In the interest of brevity, further description of control circuit 40 is not provided, especially since such further description merely would be redundant of the foregoing.

Figure 11:
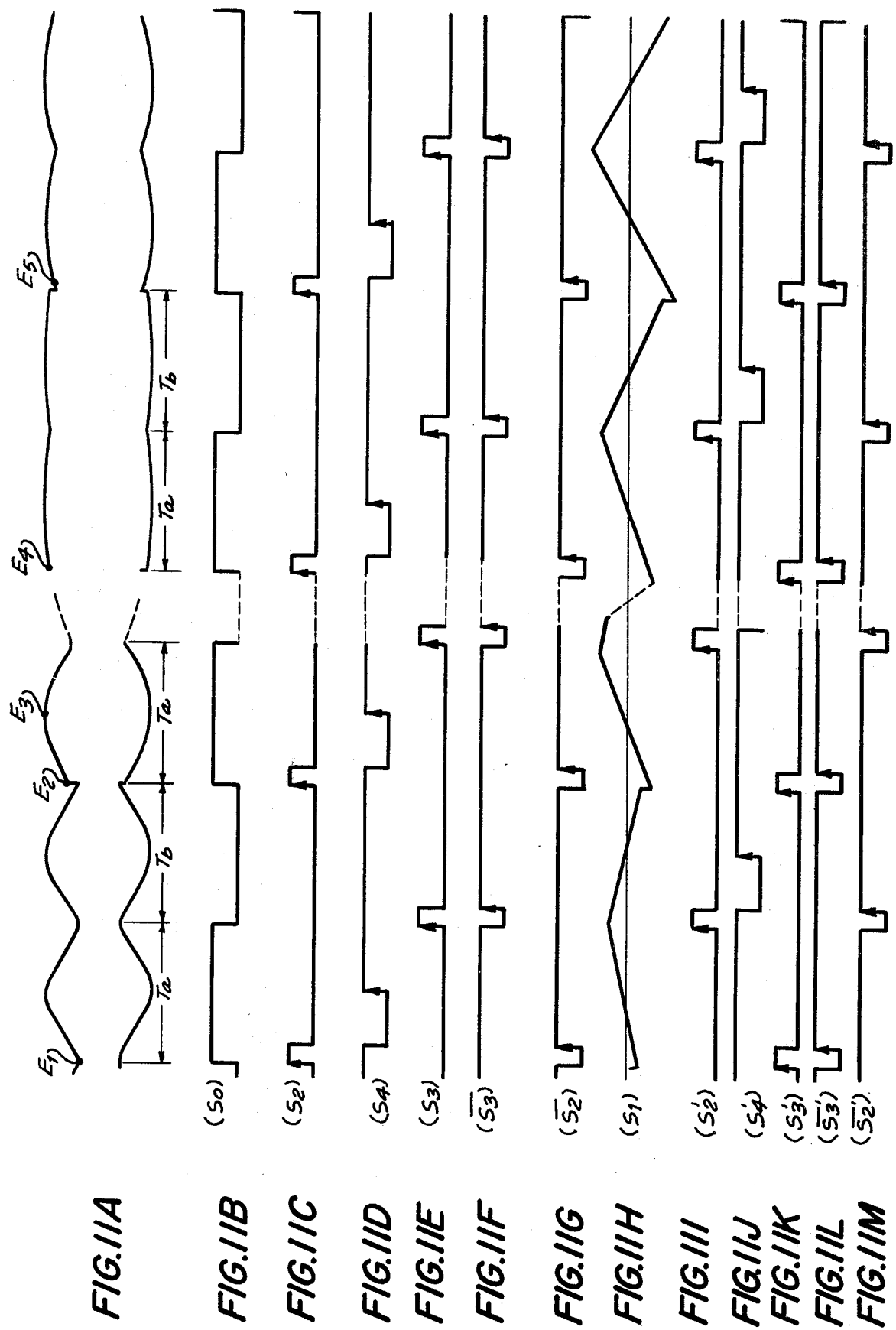
FIGS. 11A–11M are waveform diagrams which are useful in understanding the operation of the system shown in FIG. 10.
Figure 12:
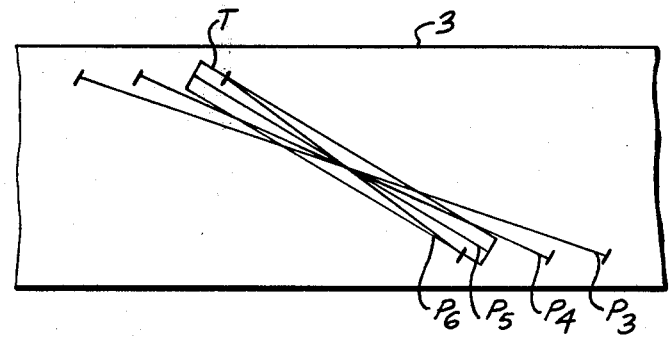
FIG. 12 shows a record track on a record medium and further shows scanning paths which deviate from that track and which are adjusted in accordance with the system shown in FIG. 10.

The operation of the tracking-error correcting system shown in FIG. 10 now will be described in conjunction with FIGS. 11 and 12. It will be appreciated that the following description relates to adjusting the scanning path traversed by head $1a$; but that this description is equally applicable to the adjustment of the scanning path traversed by head $1b$. Let it be assumed that head $1a$ scans record medium 3 during alternate field intervals $T_a$; and that head $1b$ scans record medium 3 during alternate field intervals $T_b$. If it is further assumed that the video signal recording/reproducing apparatus has parallel tracks T (FIG. 12) recorded thereon and is operated in the stop mode, then the function of bias generator 27, as described previously with respect to FIG. 5, adjusts the head support assembly such that head $1a$ traverses scanning path $P_3$ relative to track T (FIG. 12). Consequently, the envelope of the video signal reproduced by head $1a$ will appear as shown in FIG. 11A. The envelope of this reproduced signal, as detected by envelope detector 22, initially is at a relatively low level in view of the large deviation between the beginning of scanning path $P_3$ and the beginning of record track T, this envelope then increasing to the level whereat the scanning path intersects the record track at the substantial mid-point of the latter, and then the detected envelope decreases as the scanning path again deviates from the record track.

Change-over pulses $S_o$ are applied to terminal 21, and the positive transition in the change-over pulse triggers monostable multivibrator 44 to produce sampling pulse $S_2$ (FIG. 11C) and complementary sampling pulse $\overline{S}_2$ (FIG. 11G). The negative transition in the change-over pulse triggers monostable multivibrator 47 to produce sampling pulse $S_3$ (FIG. 11E) at the start of each field $T_b$, this monostable multivibrator also producing complementary sampling pulses $\overline{S}_3$ (FIG. 11F). At the termination of sampling pulse $S_2$, monostable multivibrator 50 is triggered to produce sampling pulse $S_4$ (FIG. 11D). Preferably, sampling pulse $S_4$ is a negative-going pulse, and the cumulative duration of pulses $S_2$ and $S_4$ is substantially equal to one-half of field interval $T_a$. Thus, the positive transition in sampling pulse $S_4$ substantially coincides with the mid-point of the scanning path traversed by head $1a$.

Ramp generator 37 is synchronized with change-over pulses $S_o$ to produce a ramp signal of constant amplitude, similar to the ramp signal shown in FIG. 6B. The level of this ramp signal is selectively changed by level changing circuit 41, and this level-changed ramp signal is supplied through switch circuit 38 to combining circuit 35 whereat it is combined with the DC bias signal produced by bias generator 27 and supplied as a drive signal to output terminal $39a$. Sampling circuit 43 is responsive to sampling pulse $S_2$ to sample the envelope shown in FIG. 11A at the beginning of the scanning path traversed by head $1a$. This sampled level $E_1$ is stored in sampling circuit 43, and at the time defined by sampling pulse $S_3$, that is, at the completion of field $T_a$ (or at the start of field $T_b$), the sampled level $E_1$ is transferred to storage circuit 48. At the next field interval $T_a$, sampling circuit 43 is responsive to sampling pulse $S_2$ to sample the level of the envelope-detected signal represented as $E_2$. Prior to this sampling time, clear circuit 49 is energized in response to complementary sampling pulse $\overline{S}_3$ so as to clear the residual contents of sampling circuit 43. Thus, after the envelope-detected signal is sampled by sampling circuit 43, the sampled level $E_2$ is stored in sampling circuit 43 and the sample of the envelope-detected signal at the beginning of the previous scanning path is stored as signal $E_1$ in storage circuit 48. These levels are compared by comparator 45, and since $E_2$ is greater than $E_1$ ($E_2 > E_1$), the comparator produces a binary "1". This binary "1" is stored in storage circuit 52 at the sample time determined by the positive transition in complementary sampling pulse $\overline{S}_2$. Thus, staircase generator 42 is enabled in response to this stored binary "1" to continue generating the staircase signal whose amplitude is increased by a predetermined increment at the beginning of each field interval $T_a$, that is, when head $1a$ commences its scan of record medium 3. If it is assumed that non-linear circuit 53 is omitted, this step increase in the amplitude of the staircase signal is used to correspondingly change the gain (or attenuation factor) of level changing circuit 41. Consequently, a corresponding change in the level of the ramp signal produced by ramp generator 37 is attained. This level-changed ramp signal, shown in FIG. 11H, is supplied through switch circuit 38 to combining circuit 35. It is recalled, from the previous description of FIG. 5, that switch circuit 38 is closed at a predetermined subsequent time following the actuation of stop switch 33, as determined by the time constant of monostable multivibrator 32.

Accordingly, the change in the level of the ramp signal deflects the head support assembly by a corresponding amount so as to adjust the scanning path traversed by head $1a$, as shown by path $P_4$ in FIG. 12.

Now, the effect of non-linear circuit 53 will be considered. Sampling circuit 54 is responsive to the positive transition in sampling pulse $S_4$ to sample the envelope-detected signal produced by envelope detector 22. Thus, sampling circuit 54 produces a sampled level $E_3$ (FIG. 11A) when head $1a$ arrives at the approximate mid-point of its scanning path. Sampled level $E_3$ is compared to sampled level $E_2$ by comparator 46, and the difference between these sampled levels, as represented in FIG. 11A, is used to produce a control signal for controlling the gain of non-linear circuit 53. Thus, depending upon the magnitude of this control signal, that is, depending upon the difference between the sampled levels $E_3$ and $E_2$, the amplitude of each step increase in the staircase signal is varied non-linearly so as to correspondingly vary the gain (or attenuation) of level changing circuit 41. This means that the level of the ramp signal produced by ramp generator 37 is not necessarily changed in a uniform manner at the beginning of each field interval $T_a$. Rather, the change in the level of the ramp signal is determined, in part, by the control signal produced by comparator 46 which, in turn, is representative of the deviation between the scanning path traversed by head $1a$ and record track T. Stated otherwise, since sampled level $E_3$ corresponds to the level of the envelope-detected signal at the time that head $1a$ intersects record track T at the approximate mid-point of the record track, and since sampled level $E_2$ corresponds to the envelope-detected signal level at the beginning of the scanning path traversed by head $1a$, comparator 46 will produce an output signal whose magnitude is a function of the deviation between the scanning path and the record track. When the scanning path coincides with the record track, the sampled envelope-detected level $E_2$ will be substantially equal to the sampled level $E_3$, and the control signal produced by comparator 46 will be reduced to a reference level so as to minimize the gain of non-linear circuit 53. This, in turn, means that the step increase in the staircase signal produced by staircase generator 43 also will be a minimum increase.

When head 1a traverses scanning path $P_5$ (FIG. 12), the level of the envelope-detected signal, as sampled by sampling circuit 43, will be greater than the previous sample stored in storage circuit 48. That is, the level of the signal reproduced by head 1a at the beginning of scanning path $P_5$ will be greater than the level of the signal reproduced by head 1a at the beginning of scanning path $P_4$. Consequently, comparator 45 produces a binary "1" which is used as an enabling signal to continue the operation of staircase generator 42. Since the gain of non-linear circuit 53 has been reduced to a minimum at this time ($E_3 = E_2$ for scanning path $P_5$), the step increase in the staircase signal is a minimum increase such that the level of the ramp signal is changed by a corresponding minimum amount. During the next scan of record medium 3 by head 1a, the head traverses scanning path $P_6$ (FIG. 12). The level of the signal reproduced by head 1a at the beginning of scanning path $P_6$ is equal to or less than the level of the signal reproduced by head 1a at the beginning of the preceding scanning path $P_5$. Hence, comparator 45 now produces a binary "0" which is supplied as an inhibit signal to staircase generator 42, thereby inhibiting further step increases in the staircase signal. Consequently, the level of the ramp signal produced by ramp generator 37 no longer is changed. This means that head 1a continues to traverse scanning path $P_6$ which is of sufficient coincidence with track T so as to avoid the reproduction of noise or crosstalk by head 1a.

To summarize, the DC bias signal produced by bias generator 27 (described previously with respect to FIG. 5) generally adjusts the head support assembly so as to bring the scanning path $P_3$ of head 1a into position such that its mid-point intersects track T, as shown by path $P_3$ in FIG. 12. Then, the level of the ramp signal is changed as a function of the deviation between the scanning path and record track T. In accordance with the example described above, the level of the ramp signal is increased in successive field intervals during which head 1a scans record medium 3, until the scanning path coincides with the record track. This also is represented in FIG. 12 wherein scanning path $P_3$ is adjusted to path $P_4$, and then to path $P_5$ until path $P_6$ is traversed. At that time, that is, when path $P_6$ is traversed by head 1a, the level of the ramp signal is maintained at a constant amplitude. Thus, in accordance with the tracking-error correcting system shown in FIG. 10, deviations between the scanning path traversed by head 1a and record track T are corrected rapidly. Furthermore, since the level of the ramp signal is changed as a function of this deviation, and also as a function of the inclination between the scanning path and record track (i.e., as represented by the difference between sampled level $E_3$ and sampled level $E_2$), changes in ambient temperature which affect the response of the piezo-ceramic leaf assembly to the ramp waveform drive signal and changes due to the aging of the leaf assembly, will not prevent the accurate correction of the aforedescribed tracking errors.

Control circuit 40 operates in substantially the same way as the circuitry shown in FIG. 10 and described above, except that control circuit 40 generates a drive signal for the support assembly upon which head 1b is supported. Since head 1b scans record medium 3 during field intervals $T_b$, the sampling pulses which are produced by control circuit 40 are similar to the sampling pulses shown in FIGS. 11C–11G, except that they are shifted so as to occur relative to field interval $T_b$. These sampling pulses produced by control circuit 40 are shown by the waveforms of FIGS. 11I–11M which correspond to FIGS. 11C–11G, respectively.

While a common circuit has been used to produce the DC bias signal for both of the head support assemblies, which DC bias signal may be produced in response to the envelope-detected level of the signal reproduced by either head 1a or head 1b, it is preferred to use separate ramp-drive generators for the respective head support assemblies. This takes into account any differences between the responses and other physical parameters of the head support assemblies.

Figure 13:
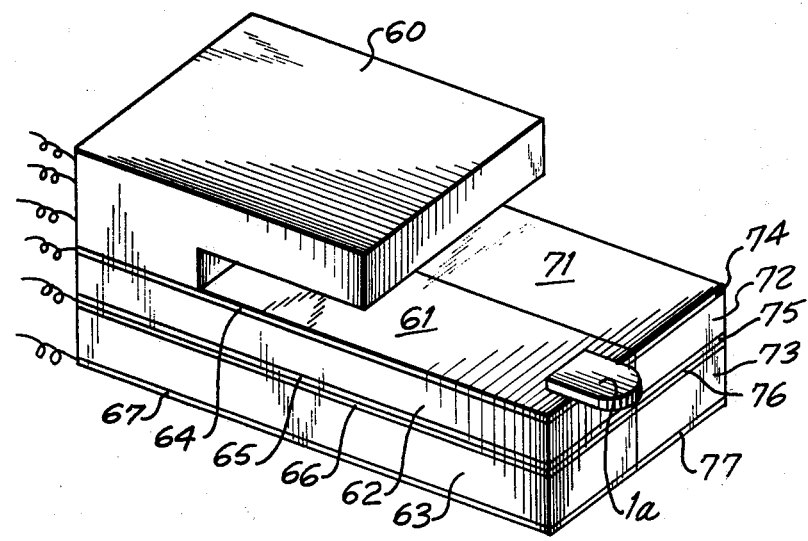
FIG. 13 is a perspective view of head support structure which can be used with the present invention.

In the head support assembly shown in FIGS. 4A and 4B, damping members 13a and 13b were provided in order to damp free or resonant oscillation of each of the leaf assemblies. In an alternative construction, electrical damping is achieved. One embodiment of a construction of the head support assembly wherein electrical damping is utilized is shown in the perspective view of FIG. 13. As shown, the head support assembly is provided with a pair of leaf assemblies 61 and 71. Head 1a is supported on only one of these leaf assemblies 61. Leaf assembly 61 and leaf assembly 71 both are constructed so as to be substantially similar to the assembly shown in, for example, FIG. 3C. Hence, in leaf assembly 61, piezo-ceramic material 62 has its opposite surfaces plated with electrodes 64 and 65, respectively, and overlies another piezo-ceramic material 63 whose opposite surfaces also are plated with electrodes 66 and 67, respectively. Leaf assembly 71 is similarly constructed of piezo-ceramic material 72 whose opposite surfaces are plated with electrodes 74 and 75, respectively, and which overlies another piezo-ceramic material 73 whose opposite surfaces are plated with electrodes 76 and 77, respectively. Leaf assemblies 61 and 71 are supported in side-by-side relation by a common mounting base 60. Base 60 is affixed either to the diametric arms or to the rotary drum which is used to rotate heads 1a and 1b (FIGS. 1A and 1B). Preferably, leaf assemblies 61 and 71 are secured to each other such that when assembly 61 is deflected by drive signals applied thereto by the tracking-error correcting system shown in, for example, FIG. 10, leaf assembly 71 is correspondingly deflected. Conducting leads are connected to suitable electrodes of leaf assembly 71 such that when this assembly is deflected, electrical signals indicative of such deflection are produced at these conducting leads.

Figure 14:
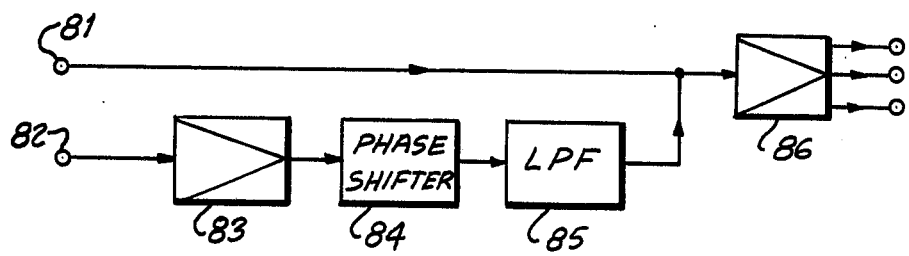
FIG. 14 is a block diagram of a damping circuit which can be used with the assembly shown in FIG. 13.

The electrical signals produced by leaf assembly 71 are used by the circuit shown as the block diagram in FIG. 14 so as to damp resonant oscillations which may be caused in response to the ramp signal which is applied as a drive signal to leaf assembly 61. In the damping circuit shown in FIG. 14, an input terminal 81 is adapted to receive the ramp drive signal and an amplifier 86 responds to this drive signal so at to apply suitable voltages to the electrodes of leaf assembly 61 wherein this leaf assembly is correspondingly deflected. Another input terminal 82 is provided to receive the electrical signal produced by leaf assembly 71 when this leaf assembly is deflected by reason of the deflection of leaf assembly 61. Input terminal 82 is coupled through an amplifier 83, a phase shifter 84 and a low pass filter 85 to amplifier 86. In the event that leaf assembly 71 begins to vibrate (so as to commence resonant oscillation), a signal indicative of such vibration is amplified and phase-shifted so as to be supplied through low pass filter 85 as a negative feedback signal to amplifier 86. That is, this negative feedback signal tends to reduce the drive signal applied to amplifier 86 from input terminal 81 so as to damp or prevent the resonant oscillation from continuing. In a preferred embodiment, phase shifter 84 provides a 180° (or phase inversion) phase shift.

Figure 15:
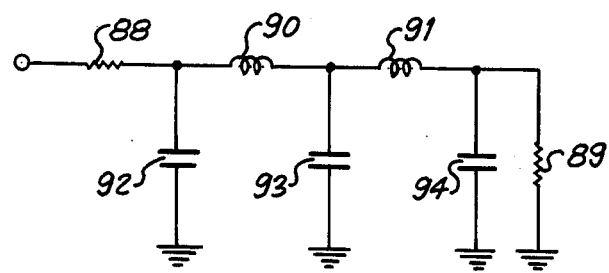
FIG. 15 is a schematic diagram of one element shown in the block diagram of FIG. 14.

One embodiment of low pass filter 86 is shown schematically in FIG. 15 wherein an input resistor 88 is coupled to ground by a capacitor 92, the junction between these elements being coupled by an inductor and then to ground by another capacitor 93, the junction between this inductor and capacitor being coupled by another inductor 91 to a parallel circuit formed of resistor 89 and capacitor 94, this parallel circuit also being connected to ground.

The tracking-error correcting system shown in FIG. 10 has been described for particular use in correcting tracking errors which occur during the still reproducing mode. However, it should be readily appreciated that the teachings of this invention can be applied to the other non-normal reproducing modes. That is, even though the record medium moves at a relatively slower rate during the slow motion reproducing mode and at a relatively faster rate during the fast motion reproducing mode, tracking errors which will arise during these reproducing modes can be corrected by the system shown in FIG. 10. Essentially, during the slow-motion or fast-motion modes, the DC bias signal produced by, for example, bias generator 27 for the purpose of adjusting the scanning path traversed by the head so as to intersect the record track at its mid-point is not a constant level. Rather, this DC signal is changed periodically. For example, in the slow-motion reproducing mode, the record medium typically is advanced at one-fourth its normal speed. Consequently, the DC bias signal will appear as a ramp waveform having a duration equal to four scans of the head. That is, the duration of the DC signal ramp waveform will be equal to the four fields during which the head, such as head 1a, scans record medium 3. Thus, the mid-point of each of the four successive scanning paths traversed by head 1a during the four successive scannings of the same record track T will intersect the central portion of the record track during each of the four scannings. This ramp signal can be generated as a function between the difference in phase between the head-position detecting pulse produced by, for example, detector 5 (FIG. 1B) and a control pulse which normally is recorded along an edge-wise margin of, for example, video tape. This DC ramp waveform is applied to combining circuit 35 (and combining circuit 35') whereat it is combined with the selective level-changed ramp signal produced by ramp generator 37 and level changing circuit 41, shown in FIG. 10.

While the foregoing description of the present invention has discussed various types of video tape recorders, it is readily apparent that the record medium may take any other desirable form, such as a magnetic sheet, or the like. Nevertheless, the principles discussed hereinabove are applicable for use with such alternative types of record media. Furthermore, FIGS. 6A and 11H have shown ramp signals having a positive-going waveform during the scanning path traversed by the magnetic head. As an alternative, the ramp waveform may exhibit negative slope. The particular slope of this ramp signal should be compatible with the response characteristics of the head support assembly. Also, the waveform of the signal during the field interval that the head does not scan the record medium may be a negative-slope ramp signal, as shown in FIG. 6B and FIG. 11H, or any other suitable waveform, as desired. Hence, the ramp drive signal may exhibit an overall triangular waveform, a sawtooth waveform, or the like. To avoid initiating unwanted resonant oscillation, a triangular waveform may be preferred over a sawtooth waveform. In addition, the duration of the ramp signal, although shown in FIG. 6B and FIG. 11H as being equal to the time for the head to traverse a scanning path completely, may be shortened in some applications. For example, this duration may correspond to one-half, one-fourth or some other fraction of the scanning path. Also, while the foregoing description has assumed that a field of video signals is recorded in track T, it may be appreciated that, if desired, each track may contain a frame of video signals or a multiple of fields. In that event, change-over pulses $S_o$ will have a corresponding frame or multiple-field duration. Still further changes and modifications in form and details will be readily apparent to one of ordinary skill in the art. Therefore, it is intended that the appended claims be interpreted as including the foregoing as well as other such changes and modifications.

What is claimed is:

1. A tracking-error correcting system for use in apparatus of the type wherein signals are recorded in parallel tracks on a record medium, the system comprising:

transducer means for repeatedly scanning said record medium in successive scanning paths which may not coincide with said parallel tracks;

ramp signal generating means for generating a periodic ramp signal of substantially constant amplitude and of a duration equal to at least a portion of the time required for said transducer means to traverse each said scanning path;

level changing means coupled to said ramp signal generating means for selectively changing the level of said ramp signal in one direction;

signal level detecting means coupled to said transducer means for detecting the level of said signal reproduced by said transducer means during successive scans of said record medium;

comparing means for comparing with each other the detected levels of the signal produced by said transducer means at locations along the scanning paths thereof at respective selected times and for controlling said level changing means in response to the comparison of said detected levels;

drive signal generating means for generating a drive signal having a component proportional to the selective level-changed ramp signal; and adjustable transducer support means for supporting said transducer means proximate said record medium and in scanning relation thereto, said support means receiving said drive signal and being operative to displace said transducer means transversely with respect to the direction along each of said parallel tracks as a function of the amplitude of said drive signal and thereby align each scanning path of said transducer means coincidently with one of said parallel tracks.

2. The system of claim 1; wherein said level changing means includes means for establishing successive, predetermined level changes for said ramp signal during successive scans of said record medium by said transducer means; and variable control means responsive to said comparing means to variably adjust the extent of each of said level changes as a function of said comparison of the detected signal levels.

3. The system of claim 2; wherein said means for establishing successive, predetermined level changes comprises a staircase generator for generating a staircase signal whose amplitude increases by predetermined increments at successive time periods, said staircase generator being synchronized with said periodic ramp signal; and gain adjust means having an adjustable gain and receiving said ramp signal for producing an adjusted-gain version of said ramp signal, the adjustable gain of said gain adjust means being responsive to said staircase signal.

4. The system of claim 3; wherein said variable control means includes nonlinear means for receiving said staircase signal and for modifying said increments with which its amplitude increases thereof as a function of the output of said comparing means, said nonlinear means supplying the modified staircase signal to said gain adjust means.

5. The system of claim 4; wherein said gain adjust means comprises a variable gain amplifier.

6. The system of claim 1; wherein said level changing means includes a variable gain amplifier for changing the level of said ramp signal; staircase signal generating means for generating a staircase signal synchronized with said ramp signal, said staircase signal having successive step increases; means for applying said staircase signal to said variable gain amplifier as a gain control signal therefor; and means coupled to said comparing means for terminating further step increases in said staircase signal in response to a predetermined comparison of said detected levels.

7. The system of claim 6; wherein said comparing means includes first sample means for sampling the detected level of the signal produced by said transducer means at a first location along the scanning path thereof during each scan of said transducer means; and a comparator for comparing the detected signal level sampled by said first sample means during one scan with the detected signal level sampled by said first sample means during a preceding scan, said comparator being operative to assume a first condition when said signal level sampled during said one scan is at least as large as said signal level sampled during said preceding scan and being operative to assume a second condition when said signal level sampled during said one scan is less than said signal level sampled during said preceding scan, said second condition terminating said further step increases in said staircase signal.

8. The system of claim 7; wherein said comparing means further includes second sample means for sampling the detected level of the signal produced by said transducer means at a second location along the scanning path thereof during each scan of said transducer means; a second comparator for comparing the detected signal levels sampled by said first and second sample means to produce an adjustment signal in accordance with the difference between said sampled signal levels; and means for adjusting the extent of said step increases in said staircase signal as a function of said adjustment signal.

9. The system of claim 8; wherein said comparing means further includes clear means for clearing the signal level sampled by each of said sample means in one sampling operation so as to prepare for a subsequent sampling operation.

10. The system of claim 1; wherein said drive signal generating means includes means for generating a bias signal, and combining means for receiving said selective level-changed ramp signal and said bias signal, the latter causing said scanning path to intersect said parallel track at the approximate mid-point of said parallel track; and said means for generating said bias signal includes storage means for storing a potential, means for increasing the amplitude of the potential stored by said storage means when said scanning path deviates from said parallel track in one direction, means for decreasing the amplitude of said potential stored by said storage means when said scanning path deviates from said parallel track in a second direction, and means for applying said stored potential to said combining means so as to initially constitute said drive signal to displace said transducer means so that said scanning path intersects said parallel track substantially at the mid-point of said track.

11. The system of claim 1 wherein said transducer means comprises a magnetic head; and said support means comprises electrically responsive flexure means upon which said head is mounted, said flexure means flexing in response to said drive signal to displace said head in a direction perpendicular to the longitudinal direction of said parallel track.

12. The system of claim 11 wherein said flexure means is formed of piezo-ceramic material.

13. The system of claim 12 wherein said piezo-ceramic material comprises a leaf assembly formed of two leaves of piezo-ceramic material, each having top and bottom surfaces provided with electrodes, the two leaves being in overlying relationship with each other.

14. The system of claim 12, further comprising damper means for damping resonant oscillations of said flexure means in response to said drive signals applied thereto.

15. The system of claim 1 wherein said ramp signal generating means comprises a triangular signal generator such that said ramp signal has an increasing portion followed by a decreasing portion, one of said portions having a duration substantially equal to the length of time for said transducer means to traverse its scanning path.

16. A tracking-error correcting system for use in video signal recording and/or reproducing apparatus of the type wherein video signals are recorded in parallel record tracks on a record medium movable relative to at least one scanning transducer with at least a field of video information recorded in each record track, said tracking-error correcting system being operative to position each said scanning transducer along a scanning path made to coincide with a record track in the event that the relative speed of movement between the record medium and the transducer during reproducing differs from said relative speed during recording and comprising:

means for driving said scanning transducer to repeatedly scan said record medium in successive scanning paths for reproducing said video signals recorded thereon;

ramp signal generating means for generating a ramp signal of substantially constant amplitude for each scan of said record medium by said transducer, said ramp signal commencing substantially when said transducer commences scanning;

variable gain amplifying means receiving said ramp signal for variable amplifying said ramp signal so as to change the level thereof in one direction;

gain control signal generating means for applying a changing gain control signal to said variable gain amplifying means to control the gain thereof, said changing gain control signal being operative to change the gain of said variable gain amplifying means for each successive scan of said transducer;

correcting signal generating means responsive to said amplified ramp signal for producing a correcting signal operative to correct for a deviation between the scanning path of said transducer and a record track;

adjustable support means for supporting said transducer relative to said record medium as said transducer scans said record medium, said support means receiving said correcting signal to displace said transducer in a direction perpendicular to the longitudinal direction of said track as a function of the amplitude of said correcting signal so as to align said scanning path coincidently with said record track; and detecting means coupled to said transducer and responsive to the video signals reproduced thereby to detect the deviation of said scanning path with respect to said record track and to detect when said scanning path substantially coincides with said record track so as to terminate the change in said gain control signal, whereby the gain of said variable gain amplifying means is maintained at a constant level.

17. The system of claim 16; wherein said gain control signal generating means includes staircase generating means for generating a staircase signal having successive step increases in the amplitude thereof, each said step increase occurring at a predetermined time during each scan of said transducer; and means for applying said staircase signal to said variable gain amplifying means as a gain control signal therefor.

18. The system of claim 17; wherein said detecting means includes means coupled to said transducer for producing a level-indicating signal representing the level of the video signal reproduced by said transducer; sampling means for sampling said level-indicating signal when said transducer arrives at a predetermined location in its scanning path; and comparing means for comparing the sampled level-indicating signal produced during one scan of said transducer with the sampled level-indicating signal produced during a preceding scan of said transducer to halt the continued operation of said staircase signal generating means when the sampled level-indicating signal produced during said one scan is less than the sampled level-indicating signal produced during said preceding scan.

19. The system of claim 18; wherein said gain control signal generating means further includes nonlinear means for applying said staircase signal to said variable gain amplifying means, said nonlinear means being responsive to said detecting means for varying the level of said step increases in said staircase signal as a function of the detected deviation of said scanning path with respect to said record track.

20. The system of claim 19; wherein said detecting means further includes second sampling means for sampling said level-indicating signal when said transducer arrives at a second predetermined location in its scanning path; and second comparing means for comparing the level-indicating signal sampled by the first-mentioned sampling means with the level-indicating signal sampled by said second sampling means during each scan of said transducer to control said nonlinear means to vary the level of said step increases in said staircase signal.

21. The system of claim 20; further comprising means for generating a first sampling signal when said transducer arrives at the beginning of said scanning path, and means for generating a second sampling signal when said transducer arrives at a middle portion of said scanning path; and means for applying said first and second sampling signals to said first and second sampling means, respectively, whereby said first sampling means samples said level-indicating signal produced by said transducer at the beginning of its scanning path and said second sampling means samples said level-indicating signal produced by said transducer at the middle portion of its scanning path.

22. The system of claim 16; wherein said recording and/or reproducing apparatus includes a second transducer for scanning said record medium, the first-mentioned and second transducers being driven in alternating, parallel scanning paths; said tracking error correcting system further comprising:

second ramp signal generating means for generating a second ramp signal of substantially constant amplitude for each scan of said record medium by said second transducer, said second ramp signal commencing substantially when said second transducer commences scanning;

second variable gain amplifying means receiving said second ramp signal for variably amplifying said second ramp signal so as to change the level thereof in one direction;

second gain control signal generating means for applying a second changing gain control signal to said second variable gain amplifying means to control the gain thereof, said second changing gain control signal being operative to change the gain of said second variable gain amplifying means for each successive scan of said second transducer;

second correcting signal generating means responsive to said second amplified ramp signal for producing a second correcting signal operative to correct for a deviation between the scanning path of said second transducer and a record track;

second adjustable support means for supporting said second transducer relative to said record medium as said second transducer scans said record medium, said second support means receiving said second correcting signal to displace said second transducer in a direction perpendicular to the longitudinal direction of said track as a function of the amplitude of said second correcting signal so as to align the scanning path of said second transducer coincidently with said record track; and second detecting means coupled to said second transducer and responsive to the video signals reproduced thereby to detect the deviation of the scanning path of said second transducer with respect to said record track and to detect when said scanning path substantially coincides with said record track so as to terminate the change in said second gain control signal, whereby the gain of said second variable gain amplifying means is maintained at a constant level.

23. The system of claim 22; further comprising storage means for storing a signal; means for selectively increasing the magnitude of the signal stored by said storage means when the scanning path of a transducer deviates to one side of a record track; means for selectively decreasing the magnitude of said signal stored by said storage means when the scanning path of said transducer deviates to the other side of a record track, whereby the magnitude of said stored signal changes until the scanning path of said transducer intersects a record track substantially at the mid-point thereof; and combining means included in each of said correcting signal generating means for combining said stored signal and a respective amplified ramp signal to produce said correcting signal.

24. The system of claim 23; further comprising switch means operative when the relative speed of movement between the record medium and the respective transducers during reproducing is changed from the relative speed during recording; and means responsive to the operation of said switch means for enabling the magnitude of said stored signal to change only over a predetermined time interval, and thereafter supplying said respective amplified ramp signals to said respective combining means to combine with said stored signal.

* * * * *